United States Patent Office

3,503,495
Patented Mar. 31, 1970

3,503,495
MASKING TAPE
Kenneth H. Gustafson, Excelsior, and Lloyd E. Picard, St. Mary's Point, Minn., assignors to Minnesota Mining & Manufacturing Company, St. Paul, Minn., a corporation of Delaware
No Drawing. Continuation-in-part of application Ser. No. 440,946, Mar. 18, 1965. This application Nov. 29, 1968, Ser. No. 780,285
Int. Cl. C09j 7/04
U.S. Cl. 206—59        2 Claims

ABSTRACT OF THE DISCLOSURE

Unusually thin stretchable pressure-sensitive adhesive masking tapes having a novel extensible, paper backing with a flat smooth non-creped appearing surface.

---

This is a continuation-in-part of application Ser. No. 440,946, filed Mar. 18, 1965, and now abandoned.

This invention relates to stretchable pressure-sensitive adhesive masking tapes and the like.

Masking tapes, supplied in roll form, have been commercially used on a large scale for many years. The conventional backing is a porous creped saturating paper (about 7 to 9 mils thick), similar to absorbent towelling paper, that is impregnated and unified by a flexible and stretchable composition which binds the fibers together, so as to unify and strengthen the paper and provide smooth tape edges, and which provides a barrier to penetration by lacquer solvents and the like. The back surface is commonly backsized with one or more thin coatings to reduce the force required to unwind the tape, and also to provide a continuous sealing coat (the surface of the impregnated paper being somewhat porous) which increases the barrier action of the backing toward lacquer solvents and which renders it smoother. The front or face surface may be given a primer coating to improve the bonding of the adhesive coating; and is coated with a pressure-sensitive rubbery-base adhesive. These masking tapes are distinctly creped, having rugosities in the backing paper with a height and depth deviation from the center line average in excess of 0.2 mil, as determined by a surface measuring instrument which plots an enlarged graph of the tape surface ("Talysurf," Taylor, Taylor and Hobson, Leicester, England). Further, the tops or peaks of the rugosities are quite sharp as shown by graphs of the tape surface.

Such masking tapes are widely used in connection with painting operations to mask various surface areas from the applied paint, lacquer, varnish or enamel, and following drying or curing, often involving a baking operation, the tape is stripped off.

The rubbery-base viscoelastic pressure-sensitive adhesive coating is aggressively tacky in its normal dry state at normal temperatures, so that the tape strongly adheres to the surface upon mere finger pressing without need of heating or moistening. This adhesive is stretchable and highly cohesive, permitting unwinding and removal of the tape without offsetting or transfer of adhesive and permitting handling without gumming the fingers. The unified backing does not rupture or delaminate when the tape is unwound from the roll or removed from surfaces to which applied, despite the force exerted by the aggressively tacky adhesive which resists unwinding and removal. The unified creped paper backing, as well as the adhesive, has a "dead-stretch" (as distinguished from a "live-stretch" such as that of rubber bands) and this permits of conformation to curved or irregular surfaces and permits the tape to be applied so as to define a stable curved masking edge when desired. The tape is readily tearable so that a workman need only use his fingers to obtain a piece of tape from the roll.

The impregnants heretofore commonly used for saturating and unifying the preformed porous creped saturating paper have been of two types. The first type is essentially a fluxed blend of broken down rubber (natural or synthetic), compatible thermoplastic tackifier resin (such as rosin), and zinc oxide, applied as a solution in a hydrocarbon solvent. The second type is a synthetic rubbery polymer applied as a solution in an organic solvent, or, more commonly, as an aqueous dispersion or latex, such as a rubbery butadiene-acrylonitrile polymer (Buna-N) or a rubbery acrylate polymer. The impregnant may include vulcanizing agents. In some instances a non-rubbery sub-polymer has been employed which, after impregnation of the paper, has been polymerized or vulcanized to a rubbery state (see U.S. Patent No. 3,248,254). These various impregnants have penetrated the pores and interstices of the preformed fibrous paper structure to glue the fibers together and also to provide a filler having the desired barrier action to impede penetration by lacquer solvents in use of the tape. The weight of the dried impregnant found necessary is generally in the range of about 50 to 100% of the weight of the untreated paper, i.e., 50 to 100% of the fiber weight.

An obviously apparent physical characteristic of prior paper-backed masking tapes is the creped structure of the paper which imparts a stretch value in the range of about 5 to 12% (by which is meant the percent elongation when the tape is pulled by hand or is slowly pulled in a testing machine until it ruptures). The back of the tape has had rugosities or wrinkles of a number and size such that they are plainly visible and can be felt when the tape is stroked or rubbed with the fingers.

A prior paper-backed masking tape having an exceptional degree of smoothness and flatness was described in the U.S. patent of Picard and Swedish, No. 2,941,661 (issued June 21, 1960). It utilized an impregnated and unified creped paper backing (about 6 to 8 mils thick, or about 5 to 6 mils thick if calendered), having a superfine crepe structure. The paper stock was made from a furnish of lightly-beaten cellulosic pulp containing a small proportion of deacetylated karaya gum.

The particular creping procedure described in that patent was to subject the freshly formed paper web, having a moisture content of about 65–70% and containing only a residual trace of the gum, to superfine creping on a steel wet press roll by use of a suitable steel creping blade which imparted at least 40 crepe lines per lineal inch. The superfine structure was retained during subsequent drying and the paper was preferaby calendered to reduce thickness and impart a still higher degree of smoothness. The resultant creped porous saturating paper could be impregnated, backsized, primed, and coated with pressure-sensitive adhesive, in any usual desired manner to provide, after slitting and winding into rolls, a highly desirable masking tape product, having an ultimate stretch value in the range of 8 to 12%. The superfine crepe lines of this tape exhibit a height and depth deviation of about 0.17 to 0.23 mil from the center line average as determined by the previously described surface measuring instrument. The superfine crepe lines of this tape are rounded and less sharp than those of conventional masking tapes as indicated by graphs from a surface measuring instrument. The difference over prior masking tapes is dramatic, this tape now having captured a large portion of the masking tape market.

We have discovered that such porous saturating paper (made from a furnish of lightly-beaten cellulosic pulp containing dispersed deacetylated karaya gum) can be advantageously compacted and extensibilized by a specifically different procedure to provide a porous stretchable paper adapted for the manufacture of masking tapes which are even flatter and smoother than those described in the aforesaid patent.

In fact the improved masking tapes provided by the present invention are so flat and have such a smooth back surface that on superficial inspection they look and feel much like so-called "flatback" paper tapes made from paper which has not been creped or extensibilized and which have a surface deviation from the center line average of about 0.06 to 0.07 mil. Yet this new masking tape is adequately stretchable and has the stress-strain elongation characteristics desired in first class masking tapes. It has adequate tear resistance but is readily finger-tearable so that pieces of tape can be removed from the roll without need for cutting the tape. The new tape is well suited for uses other than as a masking tape, for instance as a pressure-sensitive printable packaging tape.

The smooth flat back back surface of this masking tape results in less finger irritation when used day after day by workmen, as compared to tape having crepe ridges. The flatness and thinness of the tape makes for a very sharp line of demarcation at the juncture of painted and masked surface areas. Fluid paint of lacquer is prevented from seeping under the tape or building up on the edges, whether the tape is applied to form a straight or curved masking edge. A lower coating weight of adhesive is possible as compared with conventional creped paper backing papers, making for economy and contributing to thinness. The flat surface of the paper permits of good print definition in tapes employed as printable tapes. While extensible paper made in the afore-described manner can be made in varying thickness, it is possible to achieve an extensible paper of about 3 to 5 mils, even without calendering. Extensible paper of this thinness is highly desirable for masking tape, but has never heretofore been achieved in the art. Three to five mil thick extensibilized porous saturating paper has a basis weight of about 25 to 30 lbs. and a tensile strength comparable to thicker creped papers. Heavier extensibilized saturating papers up to about 60 lb. basis weight can readily be made and are correspondingly thicker (e.g., about 7 mils), prior art creped papers being about 9 to 10 mils thick at this basis weight.

The present invention utilizes a modified form of the type of extensibilizing procedure disclosed in the U.S. patent of Back and Linde, No. 3,104,197 (issued on Sept. 17, 1963 to Crown Zellerbach Corp.,) to produce what may be termed a compressively two-roll-nip extensibilized porous staturating paper having a smooth surface. In this case equivalent results can be obtained by compacting and extensibilizing a raw paper that has been partially dried after being remoistened from a dried state subsequent to complete papermaking, or by compacting and extensibilizing a partially dried moist paper during travel through the papermaking machine, the latter method being preferred. In any case the extensibilized paper is a porous saturating paper made from a furnish of lightly-beaten cellulosic pulp preferably containing water-dispersible deacetylated karaya gum in small proportion by weight relative to the paper-making fibers, such as to provide extensibilized paper which has a dry basis weight in the range of about 25 to 35 pounds (corresponding to about 80 to 110 pounds per thousand square yards). The extensibilizing operation is adjusted so that the ultimate elongation or stretch value will be at least 7% in the machine direction when a strip of the extensibilized paper is slowly pulled to the breaking point.

Unlike certain other extensibilizing procedures, this two-roll-nip-extensibilizing technique makes possible an extensibilized porous saturating paper of 25 to 35 pound basis weight which not only has an ultimate stretch of at least 7% but also has a resilient low-stretch characteristic at low pull values. This stress-stain characteristic makes it possible to pull the paper web through the equipment employed in commercial manufacture of masking tape without permanent distortion or "pulling out" of the compacted extensibilized structure. It makes possible an aggressively tacky adhesive tape which can be forcefully unwound from the roll without loss of stretch.

Using a Scott Inclined Plane Tensile Tester (which employs progressive loading to provide a stress-strain curve of tensile loading vs. elongation up to the breaking point of the strip of paper being tested), it has been found that a residual elongation of at least 7% at tensile loadings up to 5.3 lbs. per inch width is of critical importance to pulling the paper through manufacturing equipment while retaining extensibility. (These values pertain to extensibilized porous saturating papers of about 25 to 35 pound basis weight, having ultimate elongation values of at least 7%.) Masking tapes can be made therefrom which have a residual elongation of at least 8%, at loadings up to 5.3 lbs. per inch width and which have adequate stretch for masking tape usage. Even higher stretch values can be secured if desired.

In accordance with the present extensibilizing procedure, the paper web in a moist condition (moisture content in the range of about 25 to 40%) is passed through the nip formed by a smooth hard roll (e.g. steel or stone) and a soft rubber-covered elastic roll, the latter having a Shore Durometer hardness of from 10° to 50°, preferably 33°–48°. Both rolls are driven but at rates such that the surface speed of the hard roll is greater by at least about 8% than the surface speed of the elastic roll. The pressure between the rolls is relatively light (e.g., about 70 pounds per linear inch for rolls having a 16 inch diameter) but suffices to compress the elastic rubber covering of the soft roll; the compressed covering then expanding and being pulled by the action of the faster-moving hard roll at the exit of the nip, and thereafter retracting to its normal shape. The actual compacting and extensibilizing of the paper is accomplished in the recovery or recoil zone and this is less than one inch in length. The semi-dry paper web is restrained by the slower-moving rubber layer and the distortion of the latter causes a crowding or compacting of the fiber structure while under compression that results in an extensible paper. Both sides of the finished dried paper are relatively smooth but the side which contacts the smooth hard roll receives a calendering effect and is visually similar to uncreped flat paper. This extensibilizing procedure provides a smooth surface paper which can be made into a masking tape that exhibits a surface roughness deviation about 0.07 to 0.10 mil from the center line average as determined by a surface measuring instrument. The minimum roughness of masking tape made from prior art superfine crepe paper is about 70% greater than the maximum roughness of a masking tape made from paper extensibilized in this manner. Indeed, the surface roughness of tape made from these compacted extensibilized papers closely approaches that of "flatback" non-creped, non-extensibilized paper tapes.

The extensibilizing apparatus can be, and preferably is, located within the drying section of a conventional paper-making machine to permit of partial drying of the wet paper web to the desired moisture content for extensibilizing. The rolls can be driven at a rate suited to the travel speed of the paper through the paper machine.

This two-roll-nip-extensibilizing is not equivalent to extensibilizing procedures wherein the paper is maintained with its surfaces smooth and parallel and under pressure, between a contractible rubber blanket and a hard roll, contraction of the blanket crowding and distorting the fibers without causing creping. Thus the U.S. patent of Cluett, No. 2,624,245 (Jan. 6, 1953), which describes such a process as used in the production of extensible uncreped paper. It is this type of process that is used in manufacturing the "Clupak" brand of extensible papers. We have never been able to produce satisfactory masking tapes from porous saturating papers that have been rendered extensible in that manner. For one thing, such papers (and tapes made therefrom) have been found to break when being pulled through tape coating equipment, or be excessively extensible and stretch during manufacture of the tape, so that no stretch was left in the tape roll for use on the job site. As previously stated, the residual elongation should be at least 7% at tensile loadings up to 5.3 lbs. per inch width. Further, paper of this type was so dense it would not readily accept saturating impregnants. This results in a tape which split cohesively when removed from a substrate, leaving paper residue adhered to the substrate. When the saturant was applied before compacting, the paper web adhered to the equipment, often breaking. Also, applying saturant prior to compacting produced a paper which was rubbery and could not readily be extensibilized. Still further, if the paper was not fully saturated, it would absorb the adhesive which was later applied to it.

EXAMPLE

The paper was made using paper mill equipment comprising in connected series a Hollander type beater, a storage chest, a Jordan refiner, a Fourdrinier machine, and drying cylinders.

The beater furnish was prepared by charging the beater with water and semi-bleached kraft pulp in the ratio of 36 lbs. pulp (dry basis) per 100 gallons of water (4.15% by weight of cellulosic fibers). The mixture was given a light beating to a freeness value of 19° S.R. (Shopper-Riegler). The beaten pulp mixture was then diluted to reduce its consistency to approximately 2.0% (weight percent of fibers on dry basis). This furnish was pumped to the storage chest. The porosity of the paper product was varied as desired through use of the Jordan refiner to vary the fiber length (the shorter the fibers the denser the sheet). During the paper-making operation a dilute aqueous dispersion of water-dispersible deacetylated karaya gum was pumped into the furnish in the mixing box of the Fourdrinier machine, at a rate which provided approximately 1 to 2% of deacetylated karaya gum relative to paper-making fibers (on a dry solids weight basis). The machine was operated so as to produce paper products of approximately 30 lbs. basis weight (approximately 95 lbs. per 1000 square yards), approximately 4 mils caliper thickness, and approximately 8–12% stretch. In this case the paper was dried and wound into large rolls for subsequent extensibilizing. (However, the paper can be extensibilized during the paper making operation as previously mentioned.) This paper proudct contains only a residual trace of the gum. The gum functions during formation to produce a saturating paper having an exceptionally uniform fiber formation that is superior for extensibilizing by the present procedure to provide extensible "flat-backed" masking tape backing papers. Papers were made with various porosities such as to have Gurley Densometer values in the range of approximately 7 to 40 seconds (time for 400 cc. air to pass through two plies of paper).

The gum dispersion can be made as follows: To 45 gallons (375 lbs.) of water in a mixing vessel there is added 1.5 lbs. of aqueous ammonia solution (28%) and then 5 lbs. of karaya gum powder is slowly added with rapid mixing to produce a dispersion free from lumps. Aging of the mixture at room temperature for about 3 hours produces a ropy, syrupy liquid, which is then diluted by mixing in 330 gallons (2750 lbs.) of water. This dispersion contains approximately 0.16% by weight of deacetylated karaya gum (on a dry basis) and is ready for use. During the aging step, the ammonia (serving as a mild alkali) hydrolyzes and deacetylates the gum but only to the extent of all or part of the acetyl radicals constituent in it, and the resultant derivative is a water-dispersible colloid having a high degree of coherency as evidenced by the ropy, syrupy state of the dispersion, and has a high deflocculating potency, which distinguish it from the parent gum. The specificity of the deacetylated karaya gum for present usage is shown by the fact that neither the parent gum nor any of a wide variety of other gums has been found equivalent for this purpose despite the similarity they may have for other usages.

The papers of various porosities were rewet in a size press and then partially dried to a moisture content of 35% and subjected to the two-roll-nip-extensibilizing procedure, previously described, in such manner as to provide various extensible papers having ultimate elongations at break in the range of 10 to 12%, the tensile values at break being in the range of 10 to 14 lbs. per inch width. These papers had stretch values of not over 0.8% at loadings up to 2.6 lbs. per inch width, and a residual elongation of at least 7% at tensile loadings up to 5.3 lbs.

These extensible compacted saturating papers have general utility for the making of masking tape backings. It is generally desirable to have the smoothest side provide the back side of the tape, such side then appearing to be "flat" in the tape product. When the other side of the paper is examined under a magnifying glass, very fine lines can be seen. This paper can be calendered, if desired, but calendering is not necessary to obtain adequate smoothness and the "flat back" effect.

This extensibilized paper can be impregnated and unified with any of the usual compositions previously mentioned, including both water-dispersed latices and solvent-dispersed rubber-resin blends.

As an example, three lots of extensibilized papers made from raw papers having Gurley Densometer values (for two plies) of 7, 20 and 40 seconds, respectively, were made up into masking tapes as follows:

In each case the extensibilized paper web was impregnated with a solution in mineral spirits of a fluxed blend consisting essentially of 100 parts by weight of natural rubber (smoked sheets), 125 parts wood rosin and 100 parts zinc oxide, containing a small proportion of a thiuram polysulfide vulcanizing agent, followed by heating to evaporate the solvent and vulcanize the rubber. The impregnant had a dry solids weight equal to approximately 80% of the paper fiber weight. (A detailed description of this technique will be found in U.S. Patent No. 2,410,078.)

The impregnated paper web in each case was coated on the smoothest side with a backsize solution of alcohol-soluble urea-formaldehyde resin plasticized with a non-drying castor oil-modified alkyd resin, followed by heating to dry and eure the backsize to an alcohol-insoluble state (see U.S. Patent No. 2,548,980). This coating seals the porous surface and makes for an even smoother back side in the tape product.

A very thin low-adhesion backsize coating was applied thereover to provide the actual back surface which, in wound rolls of adhesive tape product, contacts the tacky pressure-sensitive adhesive coating of the overlying convolution. This low-adhesion back-size has a lower degree of adhesion to the pressure-sensitive adhesive than the backsize sealer coating would have if exposed thereto, thereby facilitating unwinding and permitting the tape product to be more easily pulled from the roll. The use of a low-adhesion backsize is particularly desirable when a backing having a flat surface characteristic is employed, owing to the intimate contact with the tacky adhesive in wound rolls as compared with masking tape constructions having marked rugosities in the backing. A preferred low-adhesion backsize (readily applied as a solution in toluol) is a copolymer of octadecyl acrylate and acrylic acid, the monomer weight ratio being such that a non-tacky low-adhesion coating is formed upon drying (see U.S. Patent No. 2,607,711).

The opposite side (face side) of the web was coated with a solution in heptane of a regular masking tape adhesive containing rubber, tackifier resin and zinc oxide, followed by drying, to provide a normally and aggressively tacky pressure-sensitive adhesive coating in a weight of about 85 pounds per thousand square yards. The coated web was subsequently slit and wound upon itself to provide rolls of masking tape of desired width and length.

The tapes which had been made from the papers of the 7 and 20 second density values had elongations of 0.25% at a tensile loading of 2.6 lbs. per inch width, and had ultimate elongations of 8.5% and 12.5%, respectively. The tape made from the least porous paper (density value of 40 seconds) had an elongation of 1.00% at a tensile loading of 2.6 lbs. per inch width and had an ultimate elongation of 15.0%. The elongations at a tensile loading of 5.3 lbs. per inch width were 1.0%, 1.5% and 2.5%, respectively.

We claim:
1. A stretchable readily finger-tearable pressure-sensitive adhesive tape having an impregnated unified compacted extensibilized paper backing coated with an aggressively tacky pressure-sensitive adhesive, wound upon itself in roll form, characterized by the features that the compacted paper is an extensibilized porous saturating paper having a smooth-surface, made from a furnish of lightly-beaten cellulosic pulp, the compacted extensibilized paper before impregnation having a residual elongation of not less than 7% at tensile loadings up to 5.3 pounds per inch width; the adhesive tape product having a residual elongation of not less than 8% at tensile loadings up to 5.3 pounds per inch width, and a surface roughness deviation from the center line average of about 0.07 to 0.10 mil.

2. The extensibilized paper backing of claim 1 made from a furnish of cellulosic pulp containing water-dispersible deacetylated karaya gum in small proportion by weight relative to the paper-making fibers.

References Cited

UNITED STATES PATENTS

| | | | |
|---|---|---|---|
| 2,069,766 | 2/1937 | Le Compte | 92—21 |
| 2,322,185 | 6/1943 | Bicknell | 92—21 |
| 2,941,661 | 6/1960 | Picard | 206—59 |
| 3,098,786 | 7/1963 | Biles et al. | 162—157 |
| 3,104,197 | 9/1963 | Back et al. | 162—113 |
| 3,300,368 | 1/1967 | Cooper et al. | 161—128 |

FOREIGN PATENTS 646,398   8/1962   Canada.

WILLIAM D. MARTIN, Primary Examiner

B. D. PIANALTO, Assistant Examiner

U.S. Cl. X.R.

117—68.5, 76, 122; 162—178